United States Patent
Hirooka

[11] Patent Number: 5,822,616
[45] Date of Patent: Oct. 13, 1998

[54] DMA CONTROLLER WITH PREFETCH CACHE RECHECKING IN RESPONSE TO MEMORY FETCH DECISION UNIT'S INSTRUCTION WHEN ADDRESS COMPARING UNIT DETERMINES INPUT ADDRESS AND PREFETCH ADDRESS COINCIDE

[75] Inventor: Junji Hirooka, Kawasaki, Japan

[73] Assignee: Fujitsu Limited, Kawasaki, Japan

[21] Appl. No.: 618,137

[22] Filed: Mar. 19, 1996

[30] Foreign Application Priority Data

Mar. 20, 1995 [JP] Japan ................................ 7-060333

[51] Int. Cl.⁶ .............................. G06F 9/24; G06F 12/08
[52] U.S. Cl. ...................... 395/842; 395/383; 395/445; 395/450; 395/464
[58] Field of Search ................................ 395/445, 450, 395/464, 383, 842

[56] References Cited

FOREIGN PATENT DOCUMENTS 2-110646  4/1990  Japan ............................. G06F 13/28

Primary Examiner—Thomas C. Lee
Assistant Examiner—Rehana Perveen
Attorney, Agent, or Firm—Staas & Halsey

[57] ABSTRACT

A computer which can efficiently perform DMA transfer even if the bus on an input/output adapter side is operating at a high speed and the bus on a main memory side is operating at a low speed. In this computer, the DMA controller functions to prefetch the data to the cache from the main memory and is provided with a prefetch address table holding the prefetch address; an address comparing unit which compares the prefetch address and the input address; a hit recheck control unit which judges if there is a hit in the cache again; and a memory fetch decision unit which instructs the hit recheck control unit to perform a hit recheck when the input address is a cache miss (mis-hit) and a comparison of the input address and the prefetch address shows they coincide while makes a read request to the main memory system when it shows they do not coincide.

19 Claims, 13 Drawing Sheets

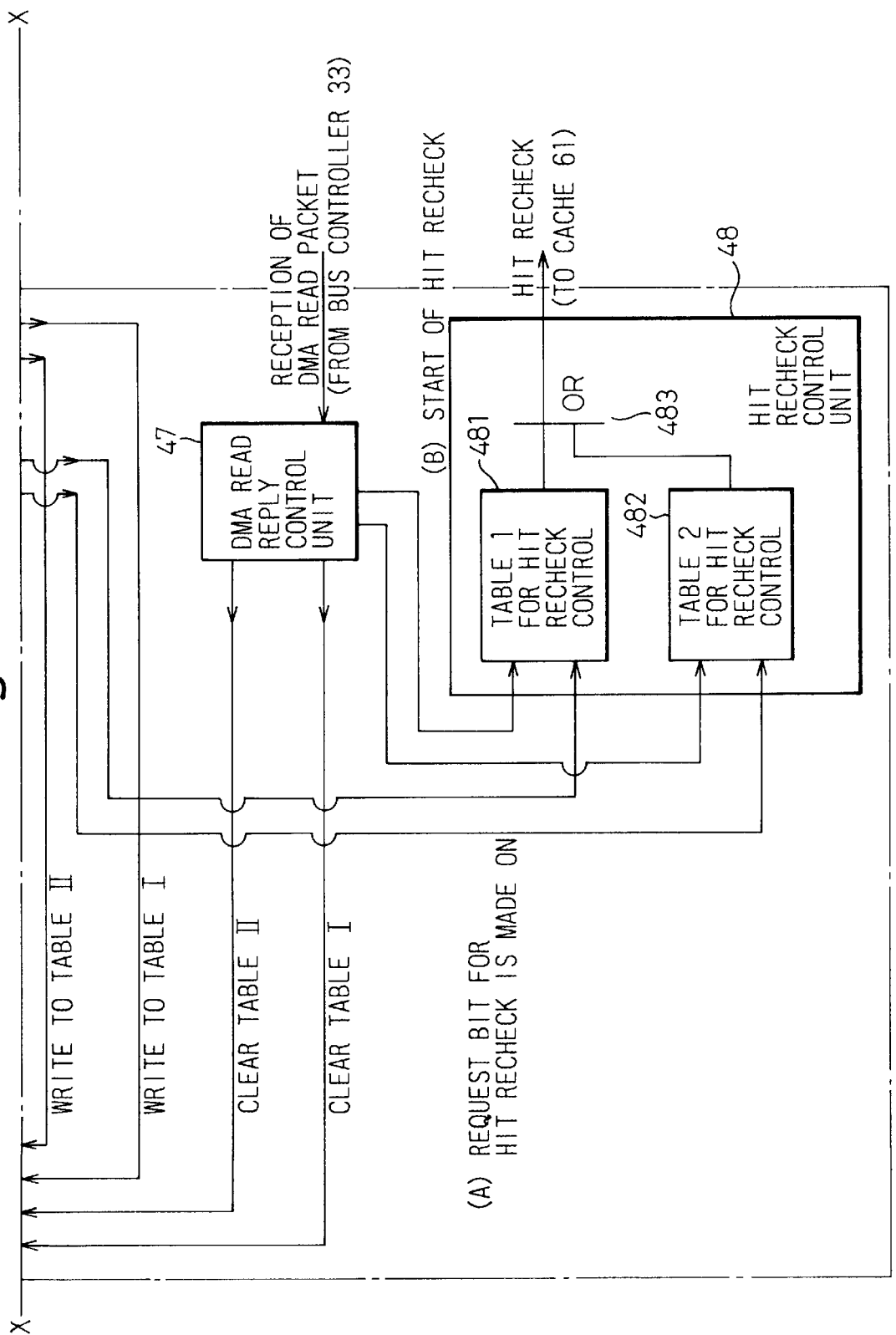

Fig. 4A

STRUCTURE OF PREFETCH ADDRESS TABLE

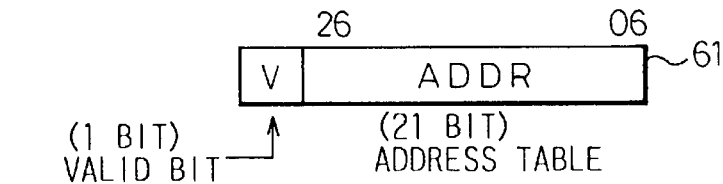

(1 BIT) VALID BIT
(21 BIT) ADDRESS TABLE

· WHEN DMA ADDRESS SPACE IS 128 MB AND CACHE LINE SIZE IS 64 BYTES

Fig. 4B

ADDRESS FORMAT OF PACKET

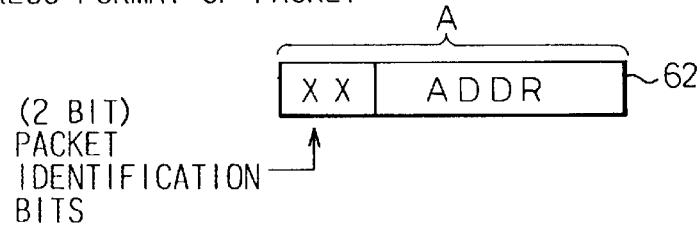

(2 BIT) PACKET IDENTIFICATION BITS

DETAILS OF PACKET IDENTIFICATION BITS
DEMAND FETCH (IF FETCH IS MISHIT)       : 00
PREFETCH (IF ADDRESS TABLE I IS USED)  : 10
PREFETCH (IF ADDRESS TABLE II IS USED) : 11

Fig. 4C

STRUCTURE OF DMA READ REQUEST PACKET

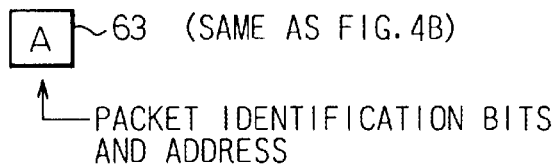

63 (SAME AS FIG. 4B)

PACKET IDENTIFICATION BITS AND ADDRESS

Fig. 4D

STRUCTURE OF DMA READ REPLY PACKET

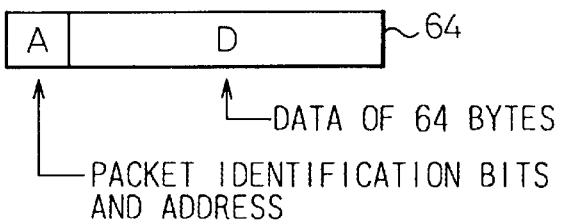

DATA OF 64 BYTES

PACKET IDENTIFICATION BITS AND ADDRESS

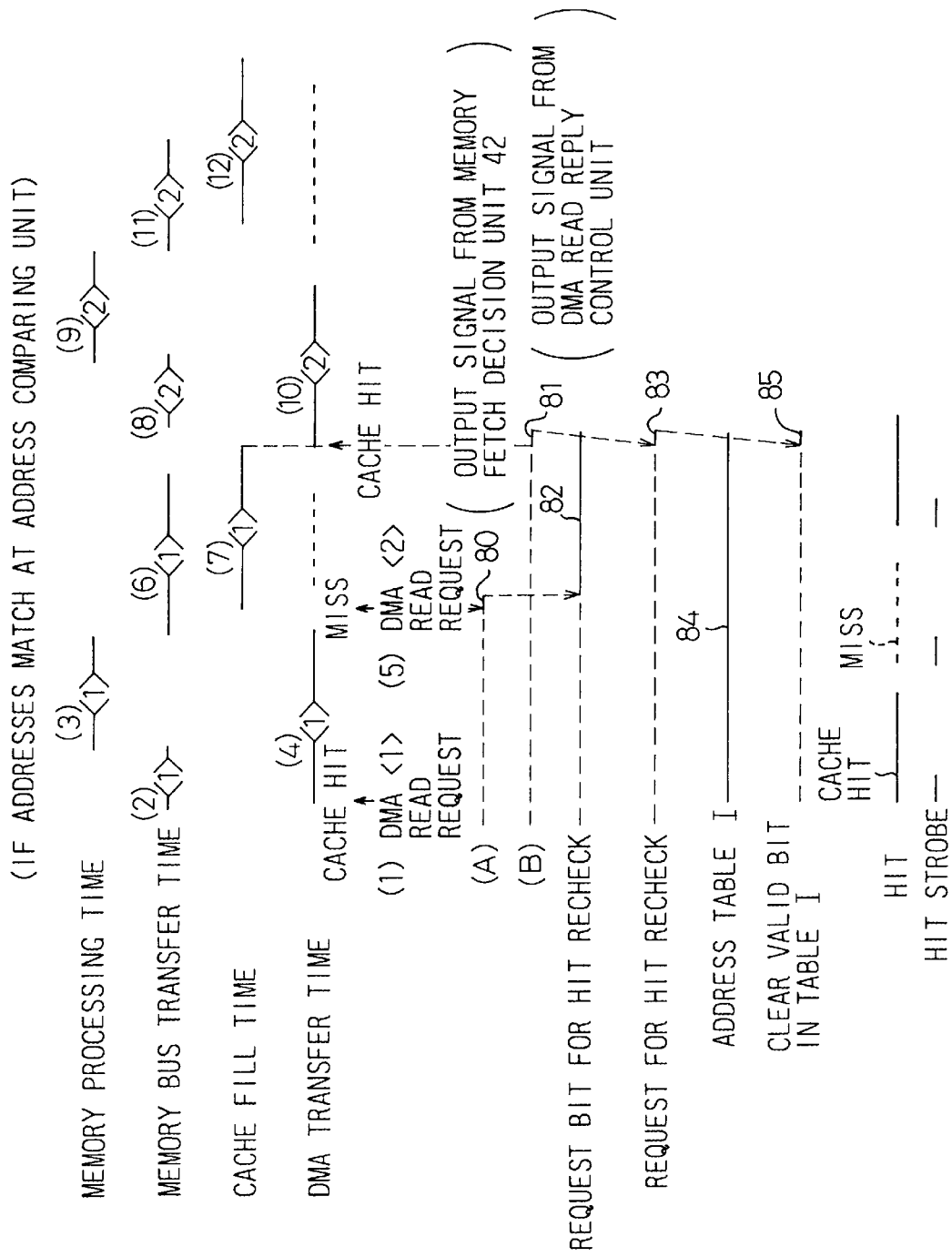

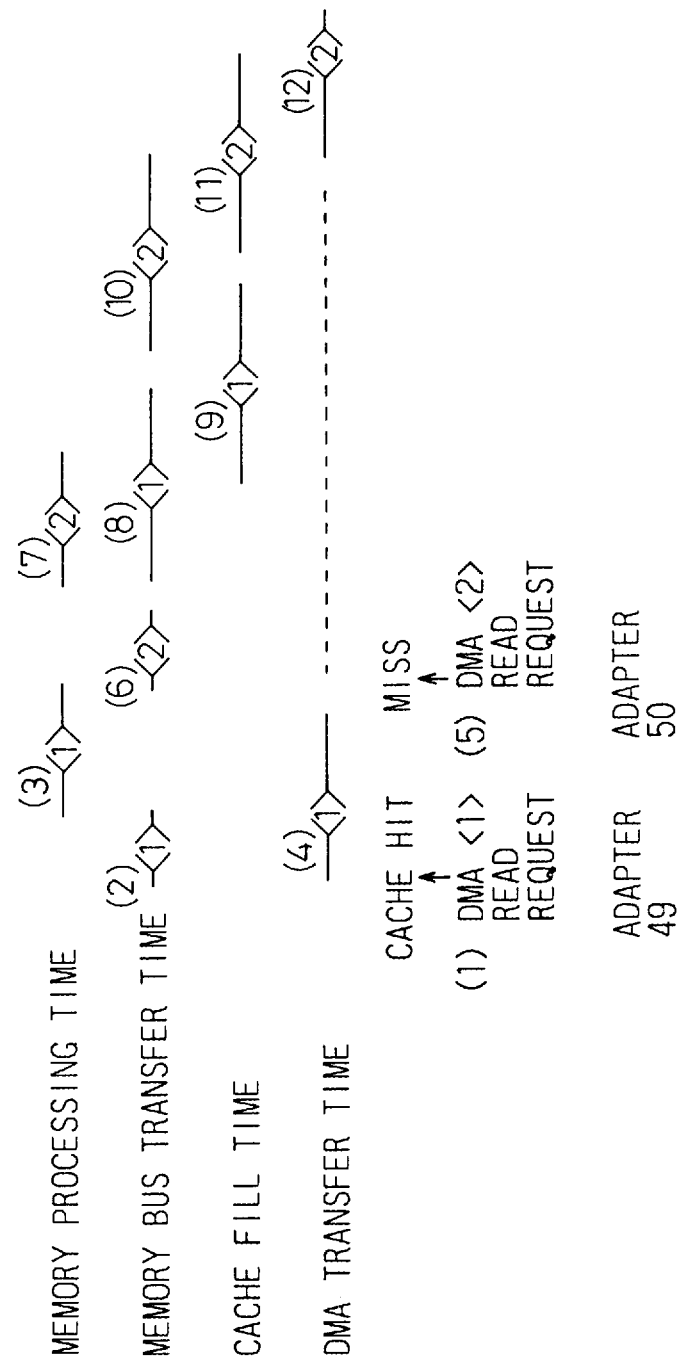

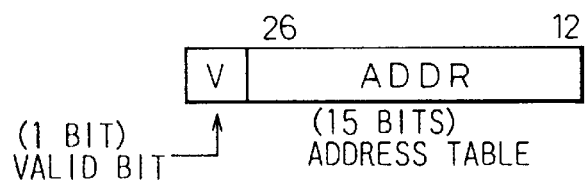
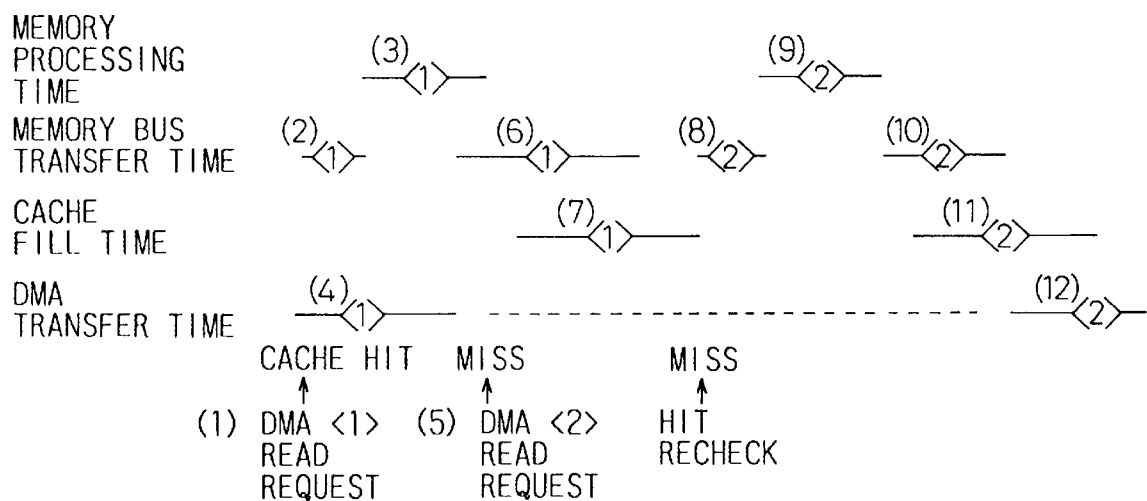

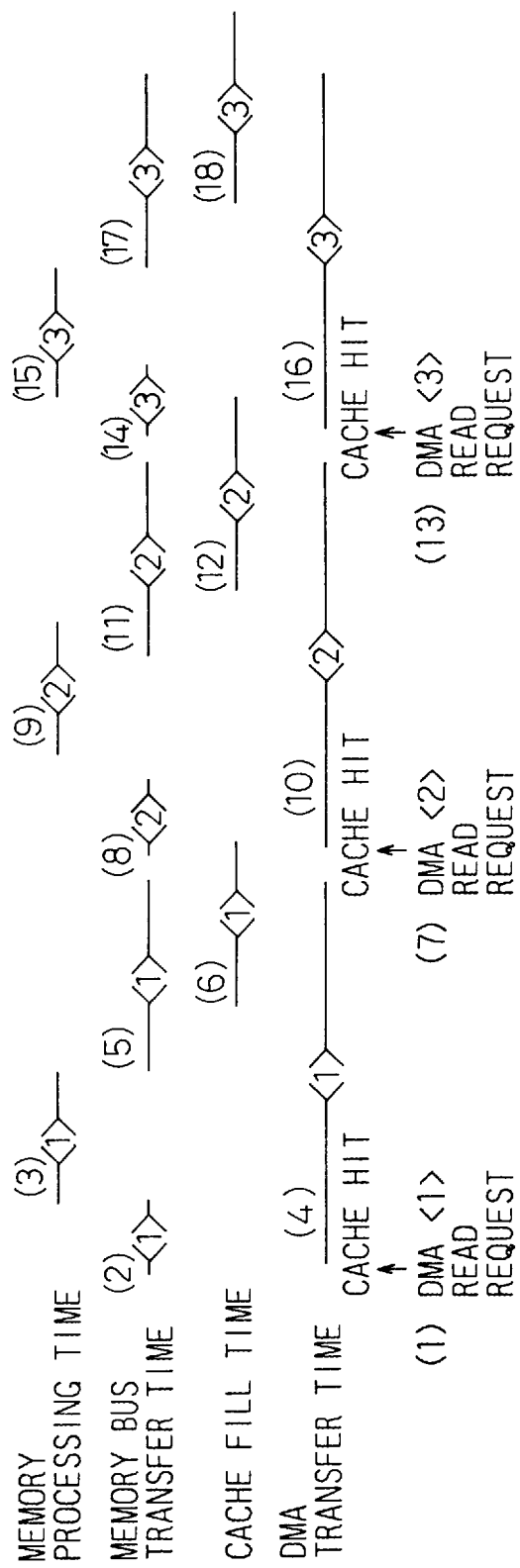

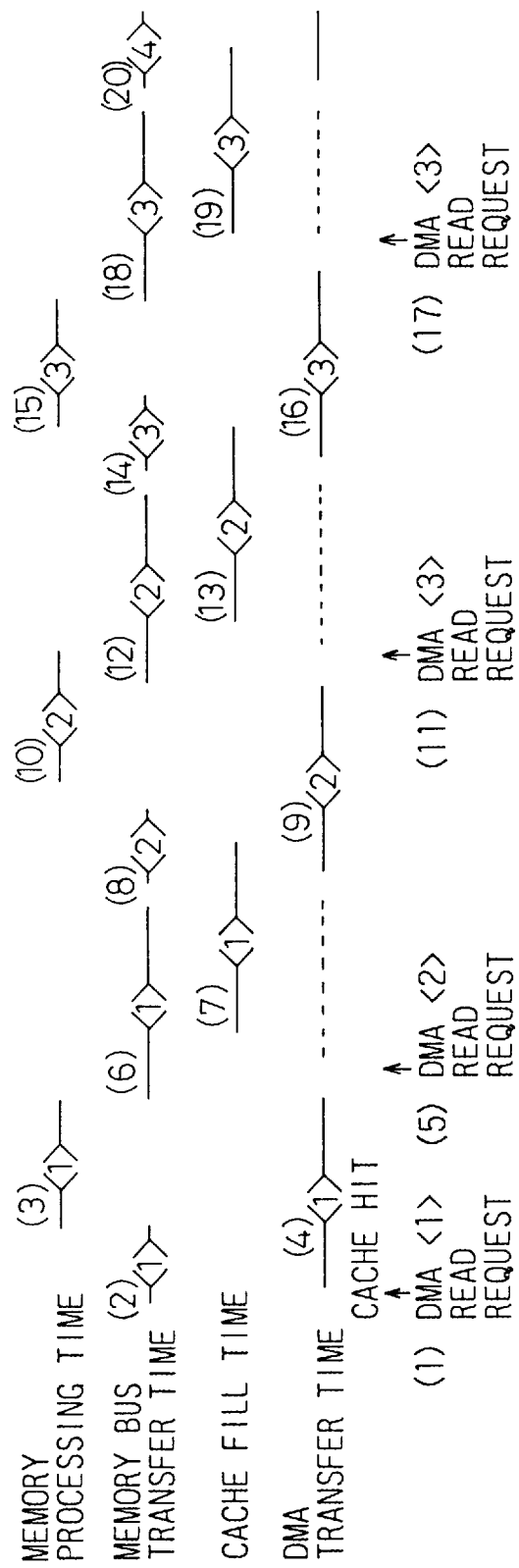

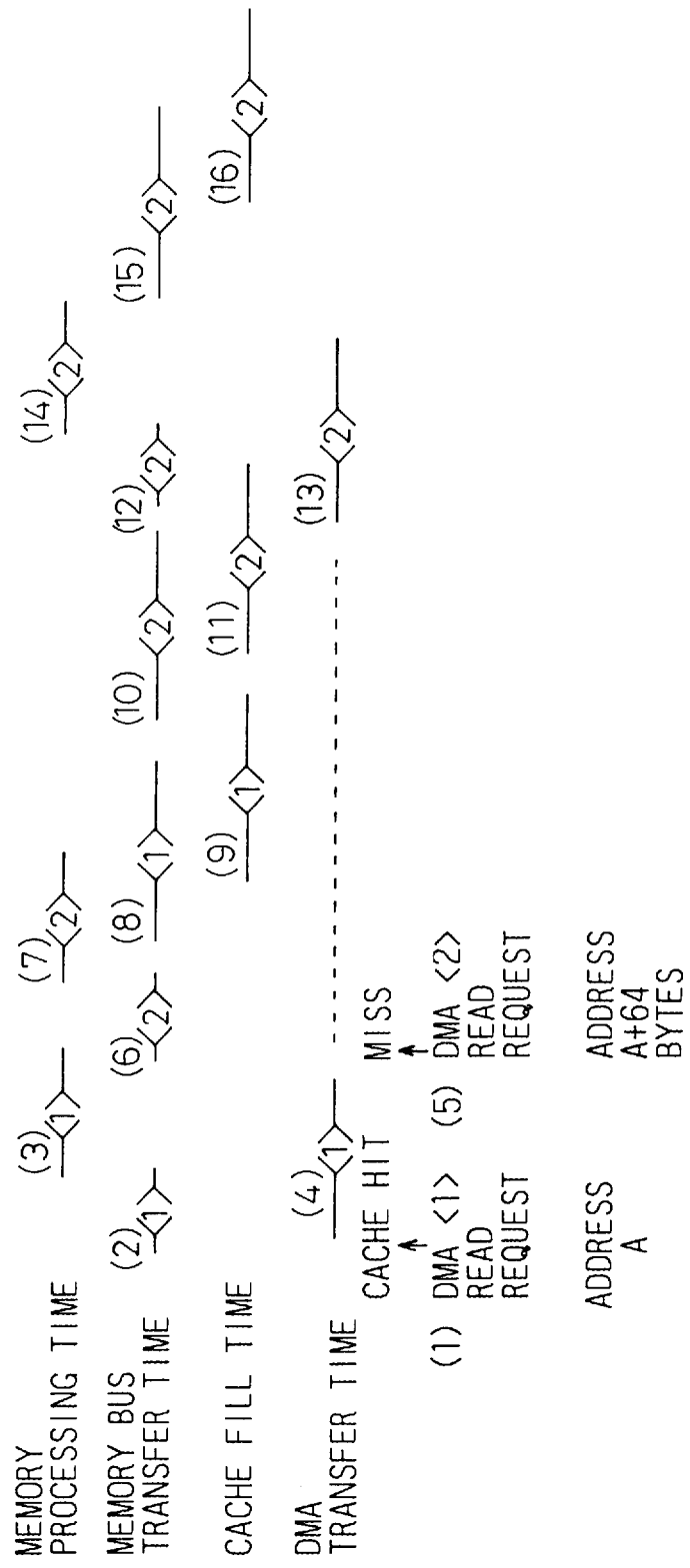

DMA CONTROLLER WITH PREFETCH CACHE RECHECKING IN RESPONSE TO MEMORY FETCH DECISION UNIT'S INSTRUCTION WHEN ADDRESS COMPARING UNIT DETERMINES INPUT ADDRESS AND PREFETCH ADDRESS COINCIDE

BACKGROUND OF THE INVENTION

1. Field of the Invention

The present invention relates to a computer having a cache memory and performing DMA data transfer to an input/output (I/O) unit.

When data is written from an I/O adapter to a memory in a central processing unit (CPU) by a DMA write operation, since the data is added to a write request, the DMA controller can start the next operation without waiting for the end of the memory write operation after ending the processing of the write request (self-control processing). When the data is read from the memory and transferred to the I/O adapter side in response to a DMA read request, however, since it is necessary to request a read operation at the memory, receive the data from the memory, and transfer the same to the I/O adapter, the next processing cannot be carried out after requesting the read operation. For this reason, a cache is provided and the content of the address for which a read request is next expected to be generated is preliminarily prefetched and written into the cache so as to enable more efficient processing by the DMA controller.

2. Description of the Related Art

As will be explained in detail later using the drawings, a conventional DMA controller having a cache and performing a prefetch operation can, when the main memory operates at a high speed, efficiently perform DMA data transfer and request read operations since the next DMA read request from the I/O adapter to the DMA controller is made at a timing of the end of the storage of the prefetch data to the cache memory. However, even if the I/O bus on the I/O adapter side is operating at a high speed, when the main memory operates at a low speed, it is necessary to wait for the read request, so the DMA transfer cannot be efficiently carried out.

More specifically, when the address of a second DMA read request is the same as the prefetch address in the first DMA read request, the same address is fetched two times, so useless processing is carried out.

SUMMARY OF THE INVENTION

Accordingly, an object of the present invention is to enable efficient DMA transfer even if the bus on the input/output adapter side is operating at a high speed and the bus on the main memory side is operating at a low speed.

To attain the above object, the present invention is constituted as follows. Namely, the DMA controller functions to prefetch data from the main memory to the cache and is provided with a prefetch address table for holding a prefetch address; an address comparing unit for comparing the prefetch address and an input address; a hit recheck control unit which decides again if there is a hit in the cache; and a memory fetch decision unit which instructs the hit recheck control unit to recheck if there is a hit when the input address is a cache miss (mis-hit) and a comparison of the input address and the prefetch address shows they coincide and requests a read operation at the main memory system when the comparison shows they do not coincide.

BRIEF DESCRIPTION OF THE DRAWINGS

The above object and features of the present invention will be more apparent from the following description of the related art and preferred embodiments made with reference to the accompanying drawings, wherein:

FIGS. 3A and 3B are views of an embodiment of a DMA controller;

FIGS. 4A to 4B are views of an embodiment of a data format of the present invention;

FIG. 5 is an explanatory view of the operation of the embodiment of the DMA controller of the present invention;

FIG. 6 is an explanatory view of the operation of the embodiment of the DMA controller of the present invention;

FIGS. 8A and 8B are explanatory views of the operation of the second embodiment of the present invention;

FIGS. 10A and 10B are views of a conventional DMA transfer method; and

FIG. 11 is an explanatory view of the problem to be solved by the invention.

DESCRIPTION OF THE PREFERRED EMBODIMENTS

Before describing the embodiments of the present invention, the related art and the disadvantages therein will be described with reference to the related figures.

Figure 9:
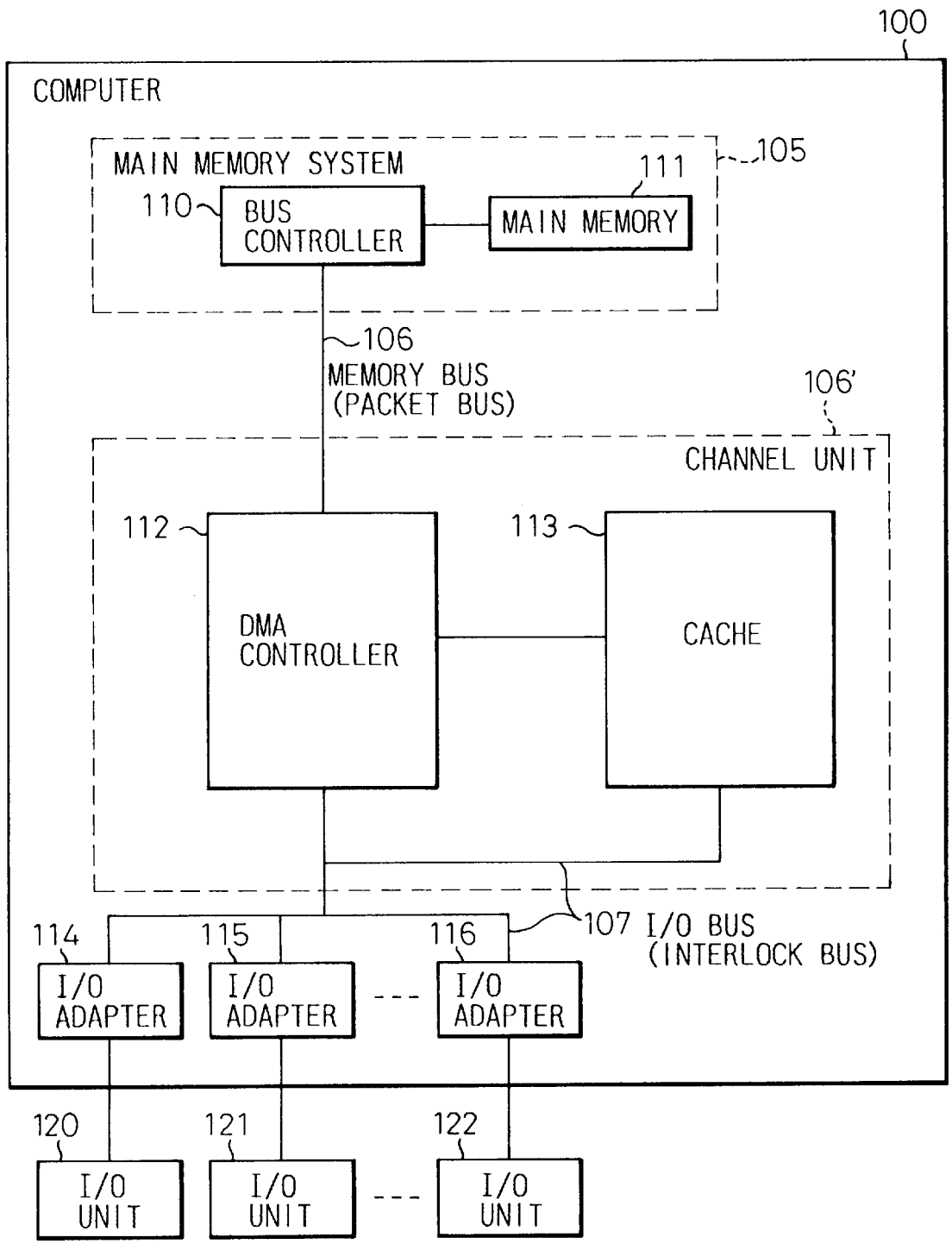
FIG. 9 is a view of conventional computer.

FIG. 9 shows a conventional computer. In FIG. 9, 100 is a computer, and 105 is a main memory system. Reference numeral 106 is a memory bus, specifically, a packet bus, which is released when the transfer of a packet is ended. For example, the memory bus is released when the main memory system 105 receives the packet. With the thus released bus, a DMA controller can transfer the next packet without receiving a reply regarding the packet.

Reference numeral 107 is an I/O bus, specifically, an interlock bus, which, when accepting a command, is exclusively used by the unit issuing the command until a reply regarding the command is returned.

Reference numeral 110 is a bus controller, which controls the memory bus 106, 111 is a main memory, 112 is a DMA controller, 113 is a cache, 114, 115, and 116 are I/O adapters, and 120, 121, and 122 are input/output units, which are respectively connected to the I/O adapter 114, I/O adapter 115, and the I/O adapter 116.

Here, an explanation will be made of the operation of the computer of the configuration of FIG. 9 referring to FIG. 10A and FIG. 10B assuming the size of a single DMA transfer is 64 bytes.

FIG. 10A shows a case where the main memory operates at a high speed.

The "memory processing time" is the time required for the processing in the main memory 111. The "memory bus transfer time" is the time required for the transfer on the memory bus 106. The "cache fill time" is the time required for storing data in the cache 113. The "DMA transfer time" is the time required for transferring the data from the cache to the I/O adapter via the I/O bus 107 by the DMA transfer.

The operation will be explained below with reference to the illustrated numerals.

(1) A request for reading of data <1> by DMA is made from the I/O adapter (DMA <1> read request).

(2) and (4) Assuming that the DMA <1> read request is a cache hit, the data of the hit address in the cache 113 is transferred by DMA to the I/O adapter via the I/O bus 107. Further, the DMA controller 112 outputs a prefetch command to the memory bus 106. The prefetch command is executed for the address (prefetch address) of the read request address +64 bytes.

(3) The main memory 111 performs the processing of the prefetch command.

(5) The prefetch data is output to the memory bus 106 from the main memory 111.

(6) The prefetch data is stored in the cache.

(7) After the DMA transfer is ended, the I/O bus is released, and the next DMA <2> read request is made from the I/O adapter to the DMA controller 112.

(8) and (10) If the DMA <2> read request is directed to the prefetch address, since it is a cache hit, the data of the hit address (prefetch data) is DMA-transferred from the cache 113 to the I/O adapter via the I/O bus 107. Then, the DMA controller 112 outputs the prefetch command requesting the data of the next prefetch address to the memory bus 106.

(9) The main memory 111 performs the processing of the prefetch command.

(11) The main memory 111 outputs the prefetch data to the packet bus 106.

(12) The prefetch data is stored in the cache.

(13) After the DMA transfer is ended, the I/O bus 107 is released, and the next DMA <3> read request is made from the I/O adapter to the DMA controller 112.

Thereafter, similar processing is carried out. Whenever data is output as a result of the DMA transfer, the prefetched data is stored in the cache 113.

Note that, when the DMA <1> read request of (1) is a miss (mis-hit), the DMA controller 112 requests data read from the main memory (outputs a "demand fetch" command). This processing of the demand fetch is then carried out in the main memory and the data is output to the memory bus and stored in the cache. That data is DMA-transferred to the I/O adapter (the time chart thereof is similar to (1), (2), (3), (5), and (6) of FIG. 10A).

Even a case where the DMA <2> read request is an address other than the prefetch address and is a hit, the same procedure is followed as in FIG. 10A. When the DMA <2> read request is a miss, the DMA controller outputs a "demand fetch" command to the memory bus. The time chart of that case is similar to (8), (9), (11), and (12) of FIG. 10A.

FIG. 10B shows the operation when the main memory operates at a low speed.

(1) A DMA <1> read request is made from the I/O adapter to the DMA controller 112.

(2) and (4) Assuming that the DMA <1> read request is a cache hit, the data is transferred from the cache 113 via the I/O bus 107 to the I/O adapter 114 by the DMA transfer. Further, the DMA controller 112 outputs a prefetch command to the memory bus 106.

(5) When the DMA transfer is ended, the I/O bus 107 is released, so the I/O adapter sends the next DMA <2> read request to the DMA controller 112. However, since the transfer of the prefetch data from the main memory to the cache 113 has not ended, the DMA <2> read request is not accepted and it is waited until the cache finishes being filled.

(6) The prefetch data (the data to be prefetched in the cache) is output from the main memory 111 to the memory bus 106.

(7) The prefetch data is stored in the cache 113.

(8) and (9) Since the storage of the prefetch data to the cache 113 is ended, the DMA controller 112 performs the transfer for the prefetched data from the cache 113 via the I/O bus 107 to the I/O adapter under a DMA mode. Then, the DMA controller 112 outputs the next prefetch command to the memory bus 106.

(11) When the DMA transfer from the cache 113 to the I/O adapter is ended, the I/O bus 107 is released, so the I/O adapter outputs the next DMA <3> read request. At this time, however, the processing for transfer of the prefetch data from the main memory 111 to the cache 113 is being carried out, so the DMA <3> read request is made to wait until the cache finishes being filled.

Thereafter, at (12) and subsequent steps, similar processing to that described above is repeated.

As described above, a conventional DMA controller having a cache and performing a prefetch operation can, when the main memory operates at a high speed, efficiently perform DMA data transfer and request read operations since the next DMA read request from the I/O adapter to the DMA controller is made at a timing of the end of the storage of the prefetch data to the cache memory. However, even if the I/O bus on the I/O adapter side is operating at a high speed, when the main memory operates at a low speed, it is necessary for the read request to be waited, so the DMA transfer cannot be efficiently carried out.

In the processing of FIG. 10B, when a DMA <2> read request is generated, the memory bus is released, so if the DMA <2> read request is a miss (mis-hit), a packet can be sent to the memory bus. Namely, (a) when the DMA <2> read request is for an address being prefetched, naturally it is a miss, so a "demand fetch" command is output. (b) When the DMA <2> read request is for another address which is a miss, a "demand fetch" command is output. (c) When the DMA <2> read request is for another address which is a hit, a prefetch command is output after the cache finishes being filled. When doing this, however, if the DMA <2> read request is for the address being prefetched, the following problem arises, so the operation shown in FIG. 10B was performed.

An explanation will be made of the problem in the conventional DMA transfer referring to FIG. 11.

In FIG. 11, (1) A DMA <1> read request is made from the I/O adapter to the DMA controller 112.

(2) and (4) If the DMA <1> read request is a cache hit, the data is transferred from the cache 113 via the I/O bus 107 to the I/O adapter 114 by DMA transfer. Further, the DMA controller 112 outputs a prefetch command to the memory bus 106.

(5) The I/O bus 107 is released when the DMA transfer is ended, so the I/O adapter sends the next DMA <2> read request to the DMA controller 112. Assuming that the DMA <2> read request is for the same address as the prefetch address, it is a miss.

(6) A "demand fetch" command is output from the DMA controller to the main memory for the DMA <2> read request.

(7) The main memory performs the processing of the "demand fetch" command of the DMA <2> read request.

(8) and (9) The transfer of the prefetch data output from the main memory to the cache memory is ended.

(10) and (11) By the processing (7) of the "demand fetch" command, the data output from the main memory (same data as the prefetch data output by the DMA <1> read request) is transferred to the cache.

(12) and (13) Therefore, when the data of the DMA <2> read request is stored in the cache, that data is transferred to the I/O adapter by the DMA transfer, and the next prefetch request is output from the DMA controller to the main memory.

(14), (15), and (16) The prefetch data is output from the main memory to the cache.

As shown in FIG. 11, when the address of the DMA <2> read request is the same as the prefetch address in the DMA <1> read request, the same address is fetched two times, so useless processing is performed.

When the address of the DMA <2> read request is different from the address being prefetched and is a miss, however, the processing can be efficiently carried out by sending a "demand fetch" command for the read request from the DMA controller to the main memory. Note that, when the DMA <2> read request is a hit, since the cache is being filled, this request is made to wait until the cache finishes being filled.

The present invention enables efficient DMA transfer even if the bus on the I/O adapter side is operating at a high speed and the bus on the main memory side is operating at a low speed.

According to the present invention, the DMA controller has a prefetch address table for holding the prefetch address, an address comparing unit which compares the prefetch address and the input address for a read request from the I/O adapter, a hit recheck control unit which determines again if there is a hit in the cache memory, and a memory fetch decision unit which instructs the hit recheck control unit to perform a hit recheck when the input address is a miss and a comparison of the input address and the prefetch address shows that they coincide and makes a read request to the main memory system where it shows they do not coincide; and performs a hit recheck at a point of time when the reply regarding the DMA read request is received when the input address is a miss and a comparison of the input address and the prefetch address shows they coincide, while makes a read request to the main memory system if it shows they do not coincide.

Figure 1:
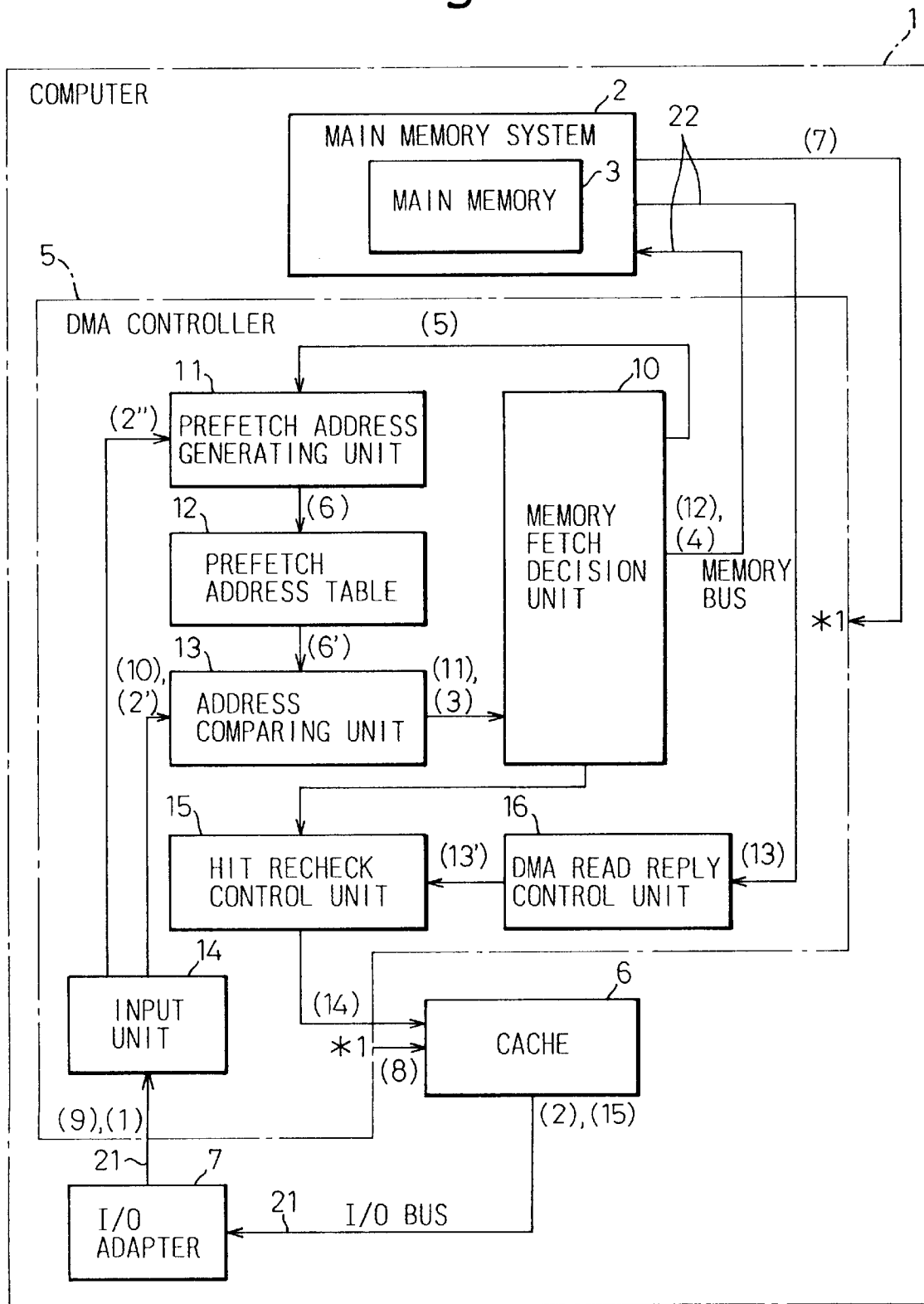
FIG. 1 is a view of the basic configuration of the present invention.

FIG. 1 shows the basic configuration of the present invention.

In FIG. 1, 1 is a computer, 2 is a main memory system, 3 is a main memory, and 5 is a DMA controller. Reference numeral 10 is a memory fetch decision unit, which instructs the hit recheck control unit 15 to perform a hit recheck if the DMA read request is a miss and the address for that request (input address) is the same as the prefetch address and which outputs the packet of the read request (demand fetch) to the main memory system 2 if they are not the same address.

Reference numeral 11 is a prefetch address generating unit which generates a prefetch address, 12 is a prefetch address table which holds the prefetch address, 13 is an address comparing unit which compares the prefetch address and the input address (address of the DMA read request), and 14 is an input unit of the DMA controller.

Reference numeral 15 is a hit recheck control unit, which performs a hit recheck for the cache 6 when there is an instruction for a hit recheck from the memory fetch decision unit 10 and notification has been received that the data transfer from the main memory system 2 to the cache 6 is ended.

Reference numeral 16 is a DMA read reply control unit, which receives a reply (response) regarding the DMA read request from the main memory system 2. Reference numeral 21 is an I/O bus between the DMA controller 5 and cache 6 and the I/O adapter (when a command is output, the I/O bus is exclusively occupied by the unit outputting that command until the reply is returned).

Reference numeral 22 is a memory bus connecting the main memory system 2 and the DMA controller 5 (when a packet is output, the memory bus is released for the next packet even if the reply regarding that packet is not yet returned).

The operation of the computer of the basic configuration of the present invention shown in FIG. 1 will be explained next.

(1) A DMA <1> read request is made from the I/O adapter 7 to the DMA controller 5. Assume that it is a cache hit.

(2) The data based on the DMA <1> read request is transferred from the cache 6 via the I/O bus 21 to the I/O adapter 7.

(2'), (3), and (4) The address comparing unit 13 does not perform a comparison since the input address is a cache hit.

(2"), (5) and (6) The memory fetch decision unit 10 instructs the prefetch address generating unit 11 to generate the prefetch address, the prefetch address generating unit 11 generates the prefetch address, and the memory fetch decision unit 10 outputs the prefetch command based on the DMA <1> read request to the main memory system 2 and writes the prefetch address in the prefetch address table 12.

(7) and (8) The prefetch data is transferred from the main memory system 2 to the DMA controller 5 and written in the cache 6.

(9) Assume that there is a DMA <2> read request from the I/O adapter 7 during the processing of (7) and (8). Then assume that it is a cache miss.

(6') and (10) The address comparing unit 13 refers to the prefetch address table 12 and compares the input address and the prefetch address.

(11) When the input address and the prefetch address are the same, the memory fetch decision unit 10 instructs the hit recheck control unit 15 to perform a hit recheck. When the input address and the prefetch address are not the same, the memory fetch decision unit 10 sends a "demand fetch" command to the main memory system 2.

(13), (13'), and (14) When the data prefetched by the DMA <1> read request finishes being stored in the cache, a reply is sent to the DMA read reply control unit 16. The DMA read reply control unit 16 then instructs a hit recheck. The hit recheck control unit 15 performs another hit check again (hit recheck) for the cache 6. There is a hit since there is the prefetched data in the cache 6.

(15) The cache 6 transfers that data via the I/O bus 21 to the I/O adapter.

Note that, if the DMA <2> read request is a hit at (9), after receiving the reply of (13), the data of the hit address in the cache 6 is transferred to the I/O adapter.

According to the present invention, even in a computer wherein the I/O bus operates at a high speed, but the main memory side operates at a low speed, the processing for the read request from the I/O adapter can be carried out with a high efficiency.

Figure 2:
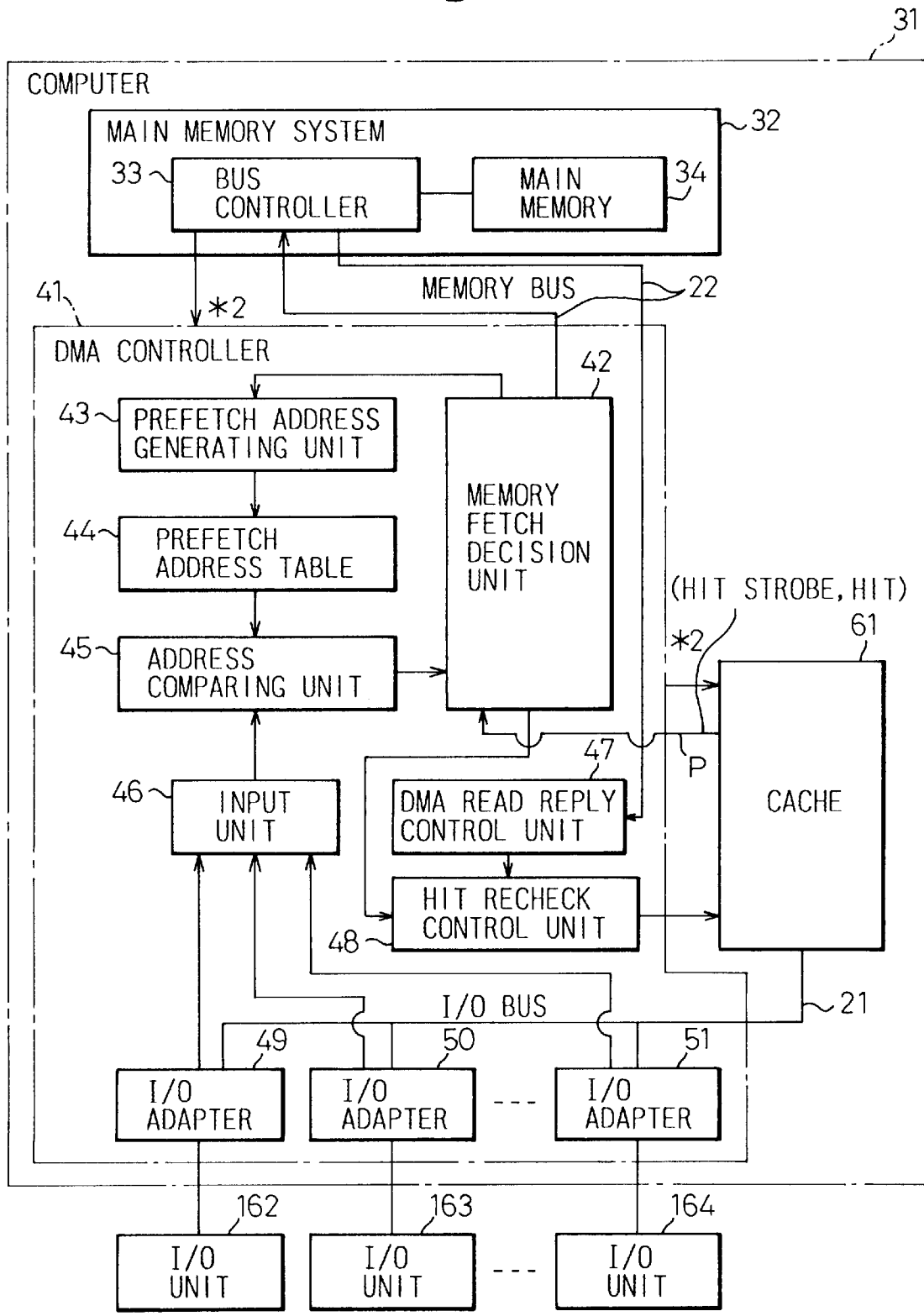
FIG. 2 is a view of a first embodiment of the present invention.

FIG. 2 shows an embodiment of the present invention. In FIG. 2, 31 is a computer, 32 is a main memory system, 33 is a bus controller, 34 is a main memory, 41 is a DMA controller, 42 is a memory fetch decision unit, 43 is a prefetch address generating unit, 44 is a prefetch address table, 45 is an address comparing unit, 46 is an input unit, 47 is a DMA read reply control unit, 48 is a hit recheck control unit, 49, 50, and 51 are I/O adapters, and 162, 163, and 164 are I/O units, which are connected to the I/O adapter 49, I/O adapter 50, and I/O adapter 51, respectively.

Figure 3A:
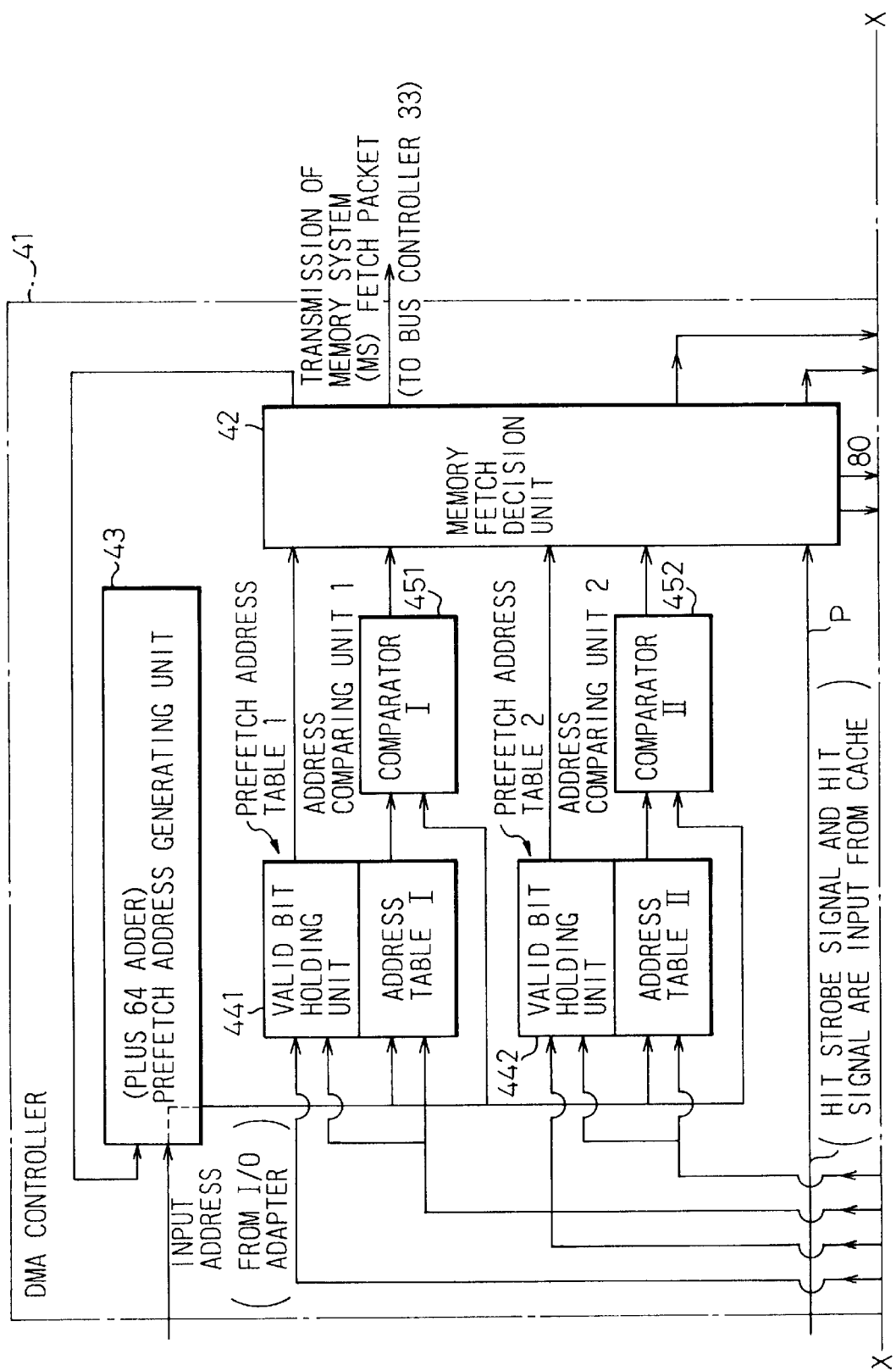

FIGS. 3A and 3B show an embodiment of the DMA controller of the present invention. They show an embodiment where two prefetch address tables (441, 442) are provided.

In FIGS. 3A and 3B, 41 is a DMA controller, 42 is a memory fetch decision unit, and 43 is a prefetch address generating unit, which is a plus 64 adder adding 64 to the input address (where a read or write operation of the memory is carried out in units of 64 bytes).

Reference numeral 441 is a prefetch address table 1, which is constituted by a valid bit holding unit and an address table I. The valid bit shows whether or not the address table I is valid.

Reference numeral 442 is a prefetch address table 2, which is constituted by a valid bit holding unit and an address table II. The valid bit shows whether or not the address table II is valid.

Reference numeral 451 is an address comparing unit 1, which compares the input address and the prefetch address from the address table I.

Reference numeral 452 is an address comparing unit 2, which compares the input address and the prefetch address from the address table II.

Reference numeral 47 is a DMA read reply control unit, 48 is a hit recheck control unit, 481 is a hit recheck control table 1 in the hit recheck control unit 48, which holds a flag showing the hit recheck instruction, 482 is a hit recheck control table 2 in the hit recheck control unit 48, which holds a flag showing the hit recheck instruction, and 483 is an OR circuit, which obtains an OR output between the output of the hit recheck control table 1 (481) and the output of the hit recheck control table 2 (482).

Note that, in the above description, a case where two address tables are provided was explained, but a larger number of address tables can be provided. By this, it becomes possible to simultaneously achieve a larger number of prefetches.

The operation of the computer of the configuration of FIG. 2 and FIGS. 3A and 3B will be explained later.

FIGS. 4A to 4D show an embodiment of the data format of the present invention.

FIG. 4A shows the configuration of the prefetch address table. Reference numeral 61 is a prefetch address table. This shows a case of a 128 MB DMA address space and a 64 byte cache line size (size of single read or write operation). The table is constituted by an address table (ADDR) of 21 bits from the sixth bit from the least significant bit to the 26-th bit and a valid bit (V).

FIG. 4B shows an address format of the packet. Reference numeral 62 is the address format of the packet which has 2 packet identification bits (XX) and an address (ADDR). When the packet identification bits are "00", it means a "demand fetch" command (fetch command issued at time of miss). "10" means to use the address table I in the prefetch. "11" means to use the address table II in the prefetch.

FIG. 4C shows the configuration of the DMA read request packet. Reference numeral 63 shows the packet identification bit and address (the same as the address format 62 of the packet).

FIG. 4D shows the configuration of the DMA read reply packet. Reference numeral 64 shows the specific configuration of the DMA read reply packet, which is composed by the packet identification bits and the address (same as FIG. 4C), and 64 bytes of data.

In FIG. 2 and FIGS. 3A and 3B, the prefetch address generating unit 43 generates a prefetch address obtained by adding 64 to the input address, and the memory fetch decision unit 42 outputs the prefetch packet to the main memory system 32. Then, the memory fetch decision unit 42 writes the prefetch address in either the address table I or the address table II of the not used prefetch address table. The valid bit thereof is then made ON. The address format of the packet output from the memory fetch decision unit 42 is as shown in FIG. 4B. The packet identification bits "00" mean a "demand fetch" at the time of a miss. "10" means to use the address table I. "11" means to use the address table II.

In the DMA read reply packet (FIG. 4D) received from the memory system 32, the same value as that when the prefetch data is requested is used ("A" of FIG. 4D is the same as "XX"+ADDR of FIG. 4B), so it is possible to identify for which DMA read request the reply packet is. Therefore, when a reply is returned, the DMA read reply control unit 47 identifies the packet identification bits "A", clears the valid bit of the address table I in the case of "10", and clears the valid bit of the address table II in the case of "11" The valid bit is not cleared in the case of "00".

The operation of the embodiment of the DMA controller of the present invention shown in FIG. 2 and FIGS. 3A and 3B will be explained referring to FIG. 5. FIG. 5 shows a case where the address of the DMA read request issued during the prefetch and the prefetch address coincide.

(1) Assume that there is the DMA <1> read request and it is a cache hit.

(2) and (4) The cache 6 checks for a hit and returns a hit signal and transfers the data of the hit address via the I/O bus 21 to the I/O adapter if there is a hit. On the other hand, the memory fetch decision unit 42 outputs a prefetch request to the memory bus 22 with the address obtained by adding 64 bytes to the hit address (input address). Further, the memory fetch decision unit 42 outputs "1" to the prefetch address generating unit 43 to instruct the generation of the prefetch address. The prefetch address generating unit 43 adds 64 to the input address to generate the prefetch address.

At this time, the prefetch address is written in the address table I and a valid bit indicating the use of the address table I is set in the valid bit holding portion. Note that, when the valid bit of the table I is ON, the prefetch address is written in the address table II, and the valid bit thereof is made ON.

(3), (6), and (7) The main memory system 32 performs the processing of the prefetch request, outputs the prefetch data from the main memory 34 to the memory bus 22, and transfers the same to the cache 6.

(5) The next DMA <2> read request is input during the writing of the prefetch data in the cache 6 or before the writing. When the address of this request is the same as the prefetch address, the hit check of the cache 6 naturally shows a miss.

The memory fetch decision unit 42 instructs the address comparing unit (address comparing unit 1 or 2) to compare the address from the prefetch address table (address table I or II) with the input address when the request is a DMA read request, the hit signal is OFF (miss), and the valid bit is ON. The DMA <2> read request address coincides with the prefetch address, so the memory fetch decision unit 42 does not output the command packet to the main memory system 32. Further, at this time, the memory fetch decision unit 42 does not instruct the prefetch address generating unit 43 to generate an address.

The hit recheck request bit to the hit recheck control unit 48 is then made ON. At this time, when the result of comparison between the input address and the address from the address table I at the comparing unit 451 is coincidence, the hit recheck control table 1 is used. When the result of comparison between the input address and the address from the address table II at the comparing unit 452 is coincidence, the hit recheck control table 2 is used.

(8) and (10) The prefetch data finishes being stored in the cache 6. A reply signal for the DMA read request is issued from the memory system 32. When receiving that reply signal, the DMA read reply control unit 47 starts the hit recheck at the hit recheck control unit 48. At this time, it is decided whether to use the hit recheck control table 1 or to use the hit recheck control table 2 by the identification bits of the read reply packet. The hit recheck control unit, by using the selected hit recheck control table, then performs a hit recheck for the cache 6. Of course, the result is a hit this time. Then, the memory fetch decision unit 42 clears the hit recheck request bit and the data prefetched from the cache 6 is transferred to the I/O adapter via the I/O bus 21.

(9), (11), and (12) Since the DMA <2> read request is a hit, the next prefetch packet is output to the memory bus 22. Then, the main memory 34 performs the prefetch processing and the next prefetch data is transferred to the cache 6 via the memory bus 22.

In FIG. 5, 84 is a signal indicating the use of the address table I and is made ON when a prefetch request is issued due to the DMA <1> read request.

Reference numeral 80 at row (A) is a signal issued from the memory fetch decision unit 42 to the hit recheck control unit 48 due to the cache miss of the DMA <2> read request and the coincidence of the input address and the prefetch address.

Reference numeral 82 shows the ON state of the hit recheck request bit set in the hit recheck control unit 48 by the generation of the signal 80.

Reference numeral 81 at row (B) is a signal issued from the DMA read reply control unit 47 to the hit recheck control unit 48 upon receipt of the read reply.

Reference numeral 83 is a signal output from the hit recheck control unit 48 according to the signal 81 issued from the DMA read reply control unit 47.

Reference numeral 85 is a signal clearing the valid bit in the address table I output by the output of the signal 83 of the hit recheck request.

HIT is a signal issued by a hit in the cache and is not output at the time of a miss. The cache hit and the cache miss are decided by the HIT STROBE signal and HIT signal.

FIG. 6 is an explanatory view of the operation of an embodiment of the DMA controller of the present invention. It shows a case where the address of the DMA read request issued during a prefetch is a cache miss and does not coincide with the prefetch address. FIG. 2 and FIGS. 3A and 3B are referred to.

(1) Assume that there is a DMA <1> read request and it is a hit.

(2) and (4) The cache 6 performs a hit check. If there is a hit, it returns a hit signal and transfers the data of the hit address via the I/O bus 21 to the I/O adapter. On the other hand, the memory fetch decision unit 42 outputs a prefetch request to the memory bus 22 with the prefetch address obtained by adding 64 bytes to the hit address (input address). Further, "1" is output to the prefetch address generating unit 43 to instruct the generation of the prefetch address. The prefetch address generating unit 43 adds 64 to the input address to generate the prefetch address.

At this time, the prefetch address is written in the address table I, and a valid bit indicating the use of the address table I is set in the valid bit holding portion. Note that, when the valid bit of the table I is ON, the prefetch address is written in the address table II, and the valid bit of that valid bit holding portion is made ON.

(3), (6), and (7) The main memory system 32 performs the processing of the prefetch request, outputs the data from the main memory 34 to the memory bus 22, and transfers the prefetch data to the cache 6.

(5) The next DMA <2> read request is input during the writing of the prefetch data in the cache 6 or before the writing. Assume that the input address of this request is found to be a miss by the hit check of the cache 6. The address comparing unit compares the input address and the prefetch address and decides that they do not coincide.

(6) The memory fetch decision unit 42 outputs the packet of the "demand fetch" to the memory bus 22.

(7) The main memory 34 performs the processing of the "demand fetch".

(8) and (9) The prefetch data of the DMA <1> read request is output to the memory bus 22 and stored in the cache 6.

(10) and (11) The data of the DMA <2> read request is output to the memory bus 22 and stored in the cache 6.

(12) The data of the DMA <2> read request is output from the cache 6 via the I/O bus 21 to the I/O adapter.

Note that, when there is a hit in the cache 6 at (5), after the end of the storage processing of the prefetch data of the DMA <1> read request in (9), the data of the hit address is transferred to the I/O adapter and the next prefetch is requested to the main memory from the memory fetch decision unit 42.

Figure 7:
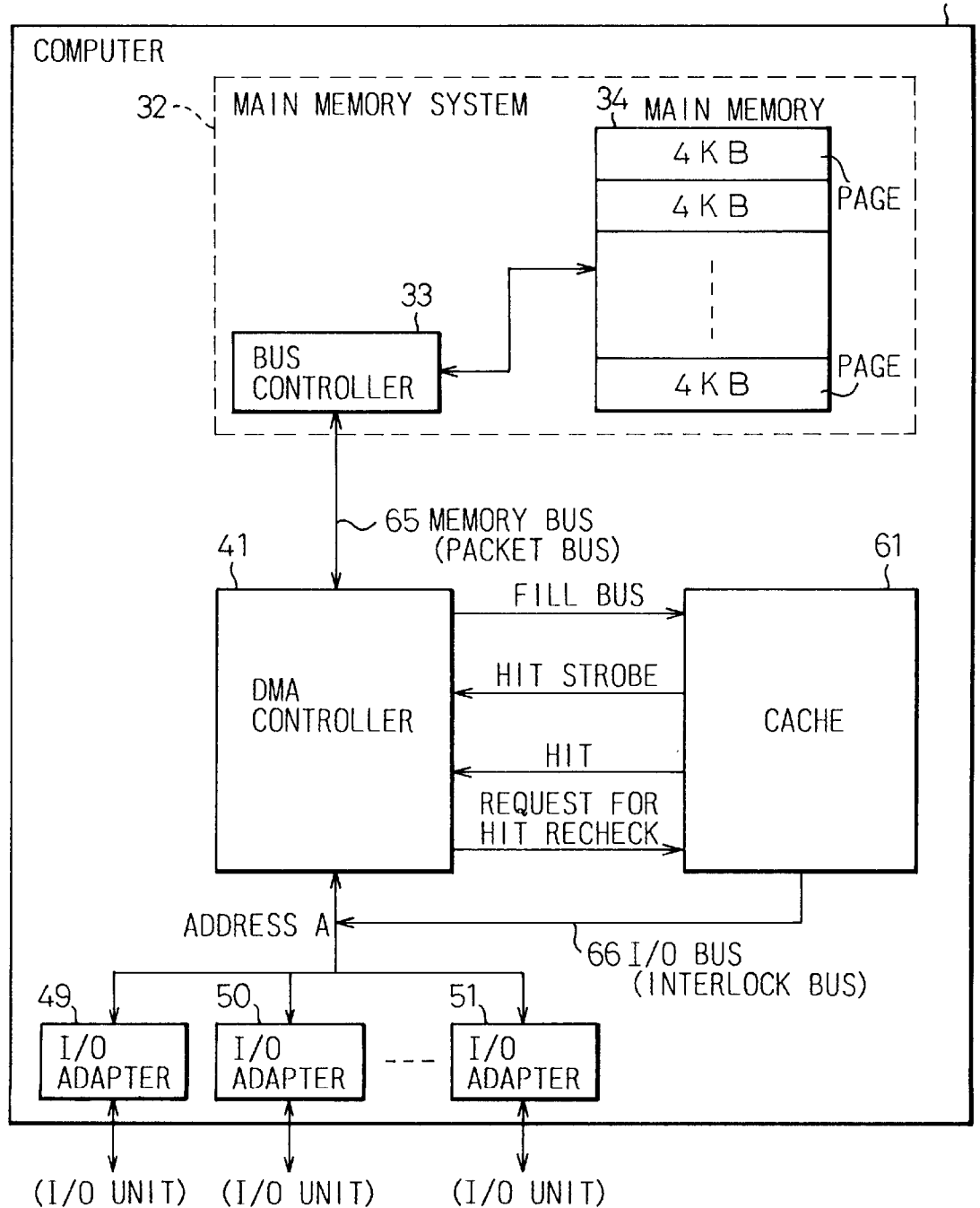
FIG. 7 is a view of a second embodiment of the present invention.

FIG. 7 shows a second embodiment of the present invention regarding the application to a virtual memory.

In FIG. 7, 31 is a computer, 32 is a main memory system, 33 is a bus controller, 34 is a main memory, in this case, a virtual memory divided into "pages" of 4 KB unit lengths, 41 is a DMA controller, 49, 50, and 51 are I/O adapters, 61 is a cache, 65 is a memory bus (packet bus), and 66 is an I/O bus (interlock bus).

In the present embodiment, a read request is not only made to wait when the read request is input for an address being prefetched, but is also made to wait when the read request is input for the address of the same page until the storage processing of the prefetch data is ended. The configuration of the DMA controller of the present embodiment is the same as the case of the first embodiment of FIG. 2 and FIGS. 3A and 3B except the operation of the address comparing unit differs in this point.

Due to this, with respect to a request for access to the address A, even when the access to an address A or an address other than A+64 (for example, A+128 etc.) is generated next, the hit recheck shows a miss and the efficiency is lowered. In general, however, the DMA transfer is performed by access in the order of A, A+64, A+128, and A+192 and the same page is never accessed by another adapter, so the timing chart of the present embodiment becomes similar to that of FIG. 5 and there is no problem in practice.

In the case of the present embodiment, when assuming that the DMA address space is 128 MB and the page size is 4 KB, it is sufficient so far as the address table has bits of from $2^{26}$ to $2^{12}$. The number of bits of the address table can be decreased by 6 bits from the case of the first embodiment.

FIGS. 8A and 8B are explanatory views of the operation of the second embodiment of the present invention.

FIG. 8A shows the configuration of the address table. In the address table of the second embodiment, when the DMA address space is 128 MB and the page size of the memory is 4 KB, the address may be composed by 15 bits and the valid bit by 1 bit. Accordingly, the table can be composed by 6 less bits than the address table of the first embodiment (refer to FIG. 4A).

FIG. 8B shows the operation of the DMA controller and the memory system (note that, for the explanation of FIG. 8B, refer to FIG. 2 and FIGS. 3A and 3B).

Assume that the address of the DMA <2> read request is on the same page as the address of the DMA <1> read request.

(1) Assumed that there is a DMA <1> read request and it is a hit.

(2) and (4) The cache 6 transfers the hit data to the I/O adapter. On the other hand, in the DMA controller 41, the memory fetch decision unit 42 outputs a prefetch request to the memory bus 22 with the address obtained by adding 64 bytes to the hit address (input address). Further, the memory fetch decision unit 42 instructs the prefetch address generating unit 43 to generate a prefetch address. The prefetch address generating unit 43 adds 64 to the input address to generate the prefetch address.

At this time, the memory fetch decision unit instructs to write the prefetch address in the address table I or the address table II and to set the valid bit.

(3), (6), and (7) The main memory system 32 performs the processing of the prefetch request, outputs the prefetch data from the main memory 34 to the memory bus 22, and transfers the prefetch data to the cache 61.

(5) The next DMA <2> read request is input during the writing of the prefetch data in the cache 61 or before the writing. Assume that this address is the same as the prefetch address or another address on the same page. Then, assume that there is a miss at the cache 61.

The memory fetch decision unit 42 in the DMA controller 41 instructs the address comparing unit (address comparing unit 1 or 2) to compare the address from the prefetch address table (address table I or II) with the input address when there is a DMA read request, the hit signal is OFF, and the valid bit is ON. The DMA <2> read request address coincides with the prefetch address or, even if it is different, exists on the same page, so the memory fetch decision unit 42 does not output the command packet to the main memory system 32. Further, at this time, the memory fetch decision units does not instruct the prefetch address generating unit 43 to generate the prefetch address. The hit recheck request bit in the hit recheck control unit 48 is made ON.

The prefetch data finishes being stored in the cache 61. A reply signal regarding the DMA read request is issued from the main memory system 32. When receiving that signal, the DMA read reply control unit 47 starts the hit recheck at the hit recheck control unit 48. The hit recheck control unit 48 performs the hit recheck for the cache 61.

(8), (9), (10), (11) and (12) Here, when the address in (5) (i.e., DMA <2> read request address) is in the same page as the address in (1) (i.e., DMA <1> read request address and the above address in (5) does not coincide with the above address in (1)+64, the hit recheck shows a miss, and thus, the memory fetch decision unit 42 outputs the demand fetch packet to the main memory system 32.

However, if a plurality of I/O units do not access the same page, the above hit recheck does not lead to a miss, and therefore the operation thereof becomes identical to that of the embodiment of the DMA controller shown in FIGS. 5 and 6.

According to the present invention, it is possible to process a read request from the I/O adapter with a high efficiency even in a computer wherein the I/O bus operates at a high speed but the main memory side operates at a low speed. For this reason, the operation of the computer is enhanced in speed.

What is claimed is:

1. A DMA controller provided with a prefetching function, said DMA controller comprising:

a prefetch address table holding a prefetch address generated in association with a cache address;

an address comparing unit that compares the prefetch address and an input address of a DMA read request;

a hit recheck unit performing a hit recheck by comparing the input address to a cached address identifying data loaded in the cache; and a memory fetch unit that, when the input address does not coincide with a cached address, obtains a result from said address comparing unit and:

when said address comparing unit determines the input address and the prefetch address coincide, instructs said hit recheck control unit to perform a hit recheck; and when said address comparing unit determines the input address and the prefetch address do not coincide, generates a demand fetch command.

2. A DMA controller as set forth in claim 1, wherein said hit recheck control unit performs a hit recheck when a prefetch corresponding to the prefetch address in the prefetch address table has ended.

3. A DMA controller as set forth in claim 1, further comprising:

a memory bus coupling a main memory to the DMA controller, said memory bus being released when a prefetch has ended; and an I/O bus coupling each one of a plurality of I/O adapters to the DMA controller, said I/O bus being exclusively occupied by an input-output unit coupled to one of said I/O adapters from when the input-output unit issues a command until a reply is returned.

4. A DMA controller as set forth in claim 2, further comprising:

a memory bus coupling a main memory to the DMA controller, said memory bus being released when a prefetch has ended; and an I/O bus coupling each one of a plurality of I/O adapters to the DMA controller, said I/O bus being exclusively occupied by an input-output unit coupled to one of said I/O adapters from when the input-output unit issurs a command until a reply is returned.

5. A DMA controller as set forth in claim 1, further comprising:

a plurality of I/O adapters, each of which independently and exclusively accesses a page at a time of a main memory; and wherein said prefetch address table is accessible in units of pages.

6. A DMA controller as set forth in claim 2, further comprising:

a plurality of I/O adapters, each of which independently and exclusively accesses a page at a time of a main memory; and wherein said prefetch address table is accessible in units of pages.

7. A DMA controller as set forth in claim 3, further comprising:

a plurality of I/O adapters, each of which independently and exclusively accesses a page at a time of a main memory; and wherein said prefetch address table is accessible in units of pages.

8. A DMA controller as set forth in claim 4, further comprising:

a plurality of I/O adapters, each of which independently and exclusively accesses a page at a time of a main memory; and wherein said prefetch address table is accessible in units of pages.

9. A DMA controller for executing data prefetch operations, said DMA controller comprising:

a prefetch address table holding a prefetch address identifying data being prefetched to a cache in response to a first DMA read request;

an address comparing unit that performs a comparison of the prefetch address to an input address of a second DMA read request and indicates a result thereof when the second DMA read request results in a cache miss in the cache;

a memory fetch decision unit generating a hit recheck instruction when the prefetch address and the input address coincide and generating a demand fetch command when the prefetch address and the input address do not coincide;

a hit recheck control unit performing a hit recheck upon the cache in response to the hit recheck instruction.

10. The DMA controller of claim 9, wherein said hit recheck control unit performs the hit recheck when a prefetch has ended.

11. The DMA controller of claim 9, wherein the DMA controller is coupled to a main memory system through a memory bus that is released when a prefetch has ended, and the DMA controller is coupled to an I/O adapter through an I/O bus that is exclusively occupied by an input-output unit issuing a transfer command from the issue of the transfer command until a reply is returned.

12. The DMA controller of claim 9, wherein:

said DMA controller is coupled to a plurality of I/O adapters and to a main memory system including a memory accessible in page units;

said prefetch address table includes address space accessible in page units; and a first one of the I/O adapters refrains from accessing a page of the page-accessible memory when a second one of the I/O adapters is currently accessing the page.

13. The DMA controller of claim 9, wherein:

said DMA controller connects to a main memory system through a memory bus that is released when a prefetch has ended;

said DMA controller is coupled to a plurality of I/O adapters through an I/O bus that is exclusively occupied by an input-output unit issuing a transfer command upon issue of the transfer command until return of a reply;

the main memory system includes a memory accessible in page units;

said prefetch address table includes address space accessible in page units; and a first one of the I/O adapters refrains from accessing a page of the page-accessible memory when a second one of the I/O adapters is currently accessing the page.

14. A method for performing DMA data transfer from a main memory, said method comprising the steps of:

holding a prefetch address generated in response to a first DMA read request;

performing a prefetch of data corresponding to the prefetch address from a main memory system to a cache;

receiving an input address of a second DMA read request;

determining whether the input address generates a cache miss; and when a cache miss is generated, comparing the prefetch address to the input address and performing the following steps:

performing a hit recheck when the prefetch address and the input address coincide; and fetching the data indicated by the second DMA data request from the main memory when the prefetch address and the input address do not coincide.

15. The method of claim 14, wherein the step of performing a hit recheck step is performed when a prefetch has ended.

16. The method of claim 14, further comprising the steps of:

releasing a memory bus coupled to the DMA controller when a prefetch has ended; and refraining from accessing a page of the main memory with a first one of a plurality of I/O adapters when a second one of the plurality of I/O adapters is accessing the page.

17. A computer-readable medium encoded with a program for executing DMA controller prefetch operations, said program comprising the functions of:

holding a prefetch address generated in response to a first DMA read request;

performing a prefetch of data corresponding to the prefetch address from a main memory system to a cache;

receiving an input address of a second DMA read request;

determining whether the input address generates a cache miss; and when a cache miss is generated, comparing the prefetch address to the input address and performing the following steps:

performing a hit recheck when the prefetch address and the input address coincide; and fetching the data indicated by the second DMA data request from the main memory when the prefetch address and the input address do not coincide.

18. The computer-readable medium of claim 17, wherein said hit recheck performing function includes performing said hit recheck when a prefetch has ended.

19. The DMA controller as set forth in claim 3, wherein said memory bus operates at a low speed; and said I/O bus operates at a high speed.

* * * * *

UNITED STATES PATENT AND TRADEMARK OFFICE
CERTIFICATE OF CORRECTION

PATENT NO.: 5,822,616
DATED : October 13, 1998
INVENTOR(S): Junji HIROOKA

It is certified that error appears in the above-identified patent and that said Letters Patent is hereby corrected as shown below:

Item [56],

On the title page, please insert:

--U.S. References Cited
5,666,505 Bailey 09/1997
5,566,324 Kass 10/1996
5,233,702 Emma et al. 08/1993
5,170,476 Laakso et al. 12/1992--.

Col. 2, line 13, change "4B" to --4D--.

Col. 12, line 62, change "issurs" to --issues--.

Signed and Sealed this

Sixth Day of April, 1999

Attest:

Q. TODD DICKINSON

Attesting Officer

Acting Commissioner of Patents and Trademarks